United States Patent
Byrne

(10) Patent No.: US 7,024,693 B2
(45) Date of Patent: Apr. 4, 2006

(54) FILTER-BASED ATTRIBUTE VALUE ACCESS CONTROL

(75) Inventor: Robert Byrne, Voiron (FR)

(73) Assignee: Sun Microsystems, Inc., Santa Clara, CA (US)

( * ) Notice: Subject to any disclaimer, the term of this patent is extended or adjusted under 35 U.S.C. 154(b) by 974 days.

(21) Appl. No.: 10/010,748

(22) Filed: Nov. 13, 2001

(65) Prior Publication Data

US 2003/0105978 A1 Jun. 5, 2003

(51) Int. Cl.
G06F 12/14 (2006.01)
H04L 9/32 (2006.01)

(52) U.S. Cl. ......................................... 726/21; 726/26

(58) Field of Classification Search .................. 726/21, 726/26
See application file for complete search history.

(56) References Cited

U.S. PATENT DOCUMENTS

| | | | |
|---|---|---|---|
| 5,784,560 A | 7/1998 | Kingdon et al. | |
| 5,812,776 A | 9/1998 | Gifford | |
| 6,490,619 B1 | 12/2002 | Byrne et al. | |
| 6,505,238 B1 | 1/2003 | Tran | |
| 6,535,879 B1 | 3/2003 | Behera | |
| 6,539,379 B1 | 3/2003 | Vora et al. | |
| 6,792,605 B1 | 9/2004 | Roberts et al. | |
| 2003/0110246 A1 | 6/2003 | Byrne et al. | |

OTHER PUBLICATIONS

Netscape Directory Server Administrator's Guide Version 4.0, 1998, Netscape Communications Corporation, Chapter 5 & 8.*
Butler W. Lampson, "Designing a Global Name Service," Digital Equipment Corporation, 1986 Conference on Principles of Distributed Computing, 1985, (19 Pages).
Michael Donnelly, "Designing an LDAP Directory Tree," http://ldapman.org/articles/tree_design.html, May 9, 2000, (6 Pages).
"Introduction to LDAP—Introduction to LDAP," http://www.cica.es/comu/php3Doc/ref.ldap, Apr. 20, 2001, (4 Pages).
Damiani et al., "Fine Grained Access Control for SOAP E-Services," WWW10, May 1-5, 2001, (pp. 504-513).
Hays et al., "The Object Filter and Access Control Framework," PLoP 2000 Conference, 2000, (15 Pages).

* cited by examiner

Primary Examiner—Gilberto Barrón, Jr.
Assistant Examiner—Nima Khomassi
(74) Attorney, Agent, or Firm—Robert C. Kowert; Meyertons, Hood, Kivlin, Kowert & Goetzel, P.C.

(57) ABSTRACT

Various embodiments of systems and methods for implementing filter-based attribute value access control are disclosed. In one embodiment, a method involves designating a location in the directory server, providing attribute related data that includes a filter expression, and selectively controlling access to an entry situated at the designated location using the filter expression in the attribute related data. For example, access to an attribute of the entry may be denied if a criterion defined by the filter expression associated with the attribute is not met by a first value of the attribute.

31 Claims, 8 Drawing Sheets

| Attribute Type 120 | Attribute Values 122 |
|---|---|
| cn: | Barbara Jensen<br>Babs Jensen |
| sn: | Jensen |
| telephonenumber: | +1 408 555 1212 |
| mail: | babs@airius.com |

Entry 124

FILTER-BASED ATTRIBUTE VALUE ACCESS CONTROL

BACKGROUND OF THE INVENTION

1. Field of the Invention

This invention relates to distributed computer systems and, more particularly, to condition defining data such as that used to control access to entries in a directory.

2. Description of the Related Art

In certain fields of technology, computer systems such as web networks include equipment and software of diverse types and having different manufacturers. This is true at both the hardware and the software level.

It is desirable that network users ("client components") can access, upon query, to a large amount of data ("application software components") making it possible for the network users to create their own dynamic web site or to consult a dynamic web site such as an e-commerce site on an multi-platform computer system (e.g., Solaris, Windows NT, AIX, HPUX). These queries are directed to a directory (e.g., an LDAP (Lightweight Data Access Protocol directory) and managed by a directory server. It is further desirable that this access be made possible rapidly for each query arriving after a first query.

Directories often have access control mechanisms to restrict access to certain portions of the directory. For example, some access control mechanisms may be designed so that regular users only have access to the information they need to know while other users (e.g., administrators) have access to larger segments (or all) of the directory. However, the access control mechanisms may have to be duplicated a large number of times (e.g., for each node in the directory), within a given directory structure. This may induce a supplementary load in many respects, including storage capability and the usual compromise in memory between data storage and program execution, in connection with the time needed for execution.

Thus, in a directory, one needs a way to control access to directory entries, entry attributes, and the value of those attributes. In existing systems (e.g., the X500 scheme), the values of attributes are protected using a 'list of values' scheme. A 'list of values' scheme may present certain problems such as an impractical and verbose definition of the protected attribute values in certain situations (e.g., where a range of attribute values is to be protected).

SUMMARY

Various embodiments of systems and methods for implementing filter-based attribute value access control are disclosed. In one embodiment, a method involves designating a location in the directory server, providing attribute related data that includes a filter expression, and selectively controlling access to an entry situated at the designated location using the filter expression in the attribute related data.

In another embodiment, a directory server request processor includes an access control instruction processor and a filter execution processor for generating a result of a filter expression. The access control instruction processor includes an interpreter that is responsive to a filter-indicating keyword for calling the filter execution function and controls access via the directory server request in accordance with the result of the filter execution function.

One embodiment of a computer readable medium comprises program instructions computer executable to receive a request to access an attribute of a directory server entry and deny access if a criterion defined by a filter expression associated with the attribute is not met by a first value of the attribute. The program instructions may be computer executable to authorize access if the criterion defined by the filter expression associated with the attribute is met by each value of the attribute. The request to access may be a request to delete the first value of the attribute and the filter expression may be associated with operations that delete values of the attribute. The request may be denied if the criterion defined by the filter expression specifies that the attribute cannot be deleted if the value of the attribute is the first value. Alternatively, the request to access may be a request to add the first value of the attribute and the filter expression may be associated with operations that add values of the attribute. The request may be denied if the criterion defined by the filter expression specifies that the attribute cannot be added if the value of the attribute is the first value. The program instructions may be computer executable to evaluate the filter expression for each instance of the attribute and deny access if any instance of the attribute fails to satisfy the criterion defined by the filter expression.

One embodiment of a directory server may include an access control processor for processing an access control instruction controlling access to a first attribute of a first entry, where the access control instruction specifies a filter expression. The directory server may also include a filter processor for generating a result of a filter expression for a first value of the first attribute. The access control processor may provide the filter processor with the filter expression and the first value and control access to the first attribute of the first entry based on the result of the filter expression. The filter expression may define a criterion for values of the first attribute. The result of the filter expression may be false if the first value of the first attribute fails to meet the criterion defined in the filter expression. The access control processor may provide the filter processor with the filter expression and the first value if a requested access to the first attribute involves a class of operations associated with the filter expression. The result of the filter expression may be false if any value of the first attribute fails to meet the criterion defined in the filter expression.

BRIEF DESCRIPTION OF THE DRAWINGS

A better understanding of the present invention can be obtained when the following detailed description is considered in conjunction with the following drawings, in which.

Figure 1:
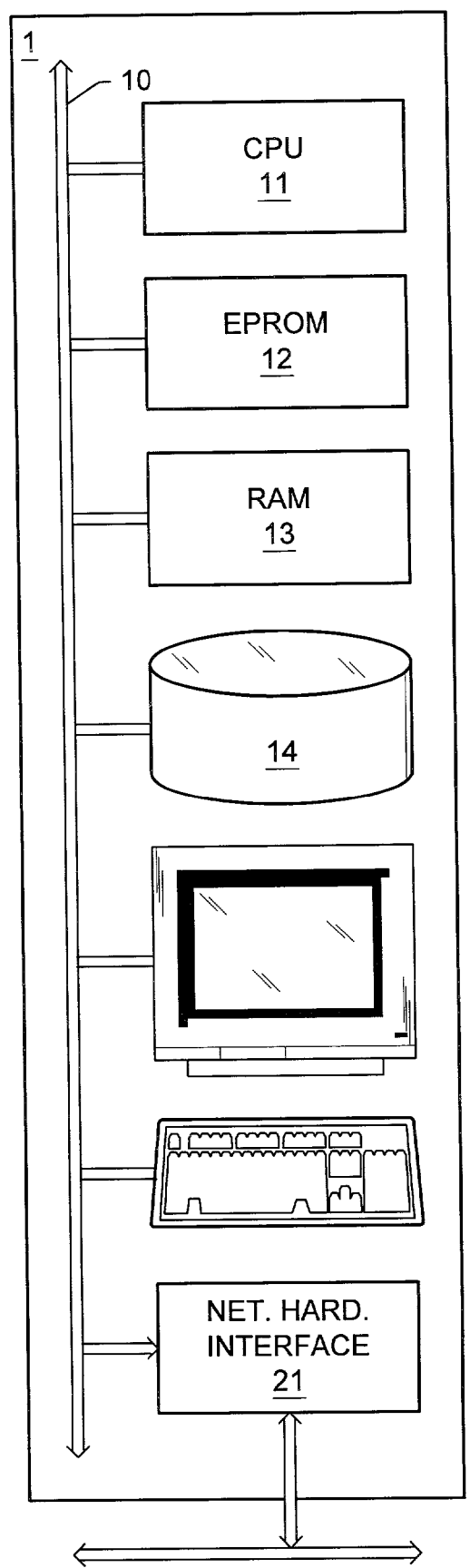
FIG. 1 is a block diagram of a computer system in which an embodiment of a macro-based access control system may be implemented.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System

This invention may be implemented in a computer system, or in a network comprising computer systems. One example of the hardware used in such a computer system is shown in FIG. 1. In FIG. 1, computer system 1 includes processor 11, non-volatile memory 12, memory 13, mass memory 14, display 15, user input device 16, network interface device 21, communication medium 20, and bus system 10.

Processor 11 may include one or more Ultra-Sparc processors or other suitable processors, as desired. Non-volatile memory 12 may include an EPROM (as shown), Flash memory, or other suitable type of memory on which to store BIOS (Basic Input Output System) instructions. Memory 13 may include a suitable type of RAM (Random Access Memory) such as DRAM, SDRAM, DDR DRAM, RDRAM, etc. Mass memory 14 may include one or more hard disk drives or other mass storage media (e.g., optical or magneto-optical drives). Display 15 may include a suitable monitor. User input device 16 may include one or more devices such as a keyboard, mouse, joystick, etc.

Instructions implementing an embodiment of macro-based access control, as described below, may be executed by processor 11 and stored in memory 13. Embodiments of software instructions may include, separately or together, the instructions used when writing the condition-defining data and/or macros (or equivalent), as well as precursors and/or generators of such instructions, and the resulting instructions, as applicable (e.g., in a directory server). In some embodiments, the instructions may be combined with language dependent and/or hardware dependent instructions and/or data. In some embodiments, the instructions may be stored on another computer readable medium (e.g., a CD, DVD, hard disk, optical disk, tape device, floppy disk, etc.). In order to execute the instructions, the instructions may be loaded into memory 13. In addition, the computer readable medium may be located in either a first computer, in which the software program is stored or executed, or in a second different computer, which connects to the first computer over a network such as the Internet. In the latter instance, the second computer may provide the program instructions to the first computer for execution. The instructions and/or data may also be transferred upon a carrier medium. In some embodiments, a computer readable medium may include a carrier medium such as networks and/or a wireless link upon which signals such as electrical, electromagnetic, or digital signals may be conveyed.

Network interface 21 may be connected to communication medium 20. In some embodiments, network interface device 21 may be an Ethernet device, a serial line device, and/or an ATM device. Communication medium 20 may be in communication with other computers (not shown). Medium 20 may include wire cables, fiber optics, and/or radio-communications, etc.

The components shown in FIG. 1 may exchange data through one or more bus systems 10, schematically shown as a single bus for ease of description. Bus system 10 may include a processor bus (e.g., a PCI (Peripheral Component Interconnect) bus) connected via appropriate bus bridges to one or more peripheral buses (e.g., an ISA (Industry Standard Architecture) bus and/or an SCSI (Small Computer System Interface) bus).

Multi-Platform System

Figure 2:
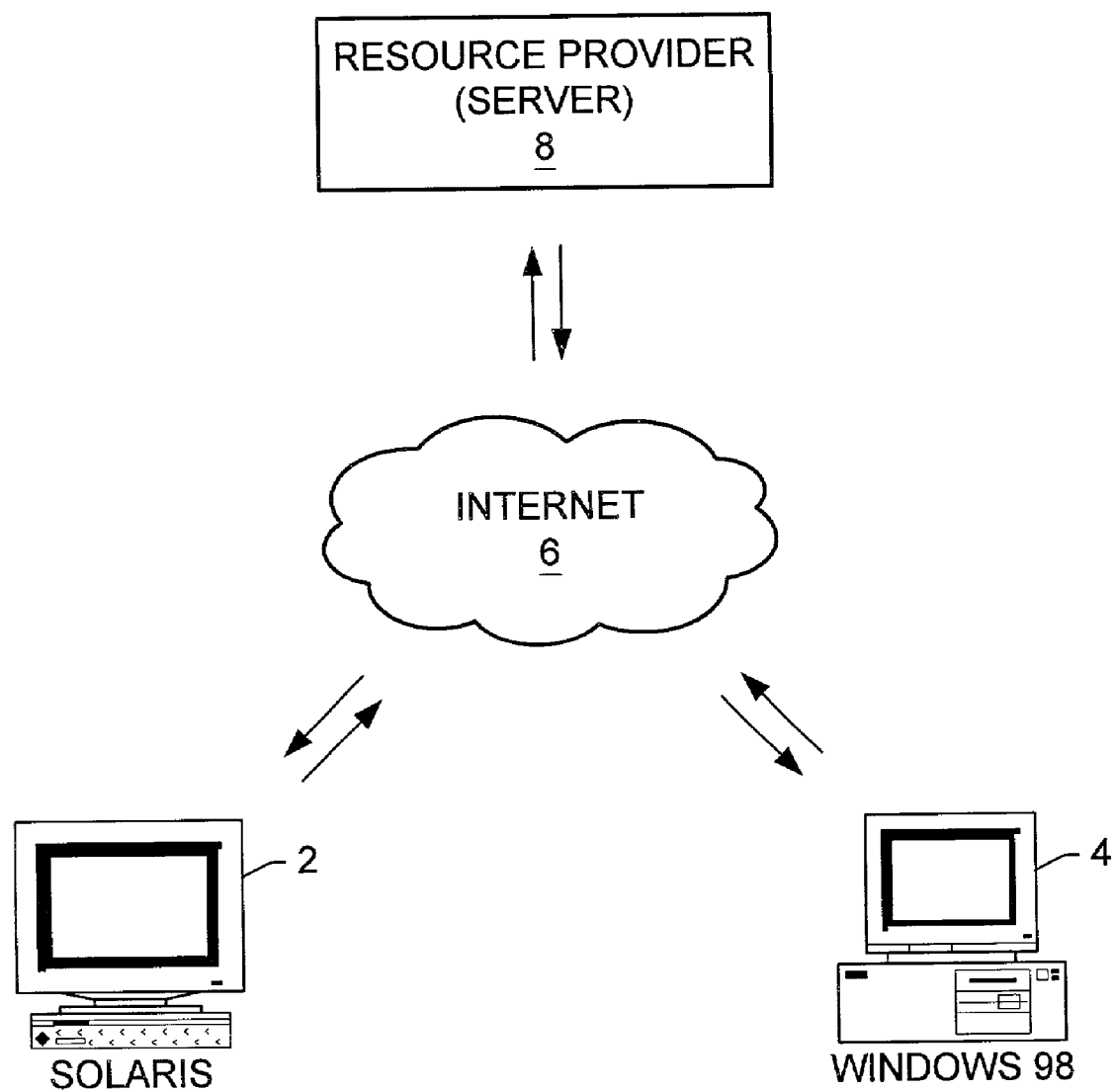
FIG. 2 illustrates a block diagram of one embodiment of a multiple platform environment.

FIG. 2 illustrates a conceptual arrangement in which a first computer 2 running the Solaris platform and a second computer 4 running the Windows 98™ platform are connected to a server 8 via the Internet 6. A resource provider using the server 8 may be any type of business, government, or educational institution. The resource provider 8 may need to be able to provide its resources to both the user of the Solaris platform and the user of the Windows 98™ platform, but may not have the luxury of being able to custom design its content for the individual platforms. Thus, effective programming at the application level may require the platform concept to be extended all the way up the stack, including all the new elements introduced by the Internet. Such an extension may allow application programmers to design for a stable, consistent environment.

Internet Service Deployment Platform

Figure 3:
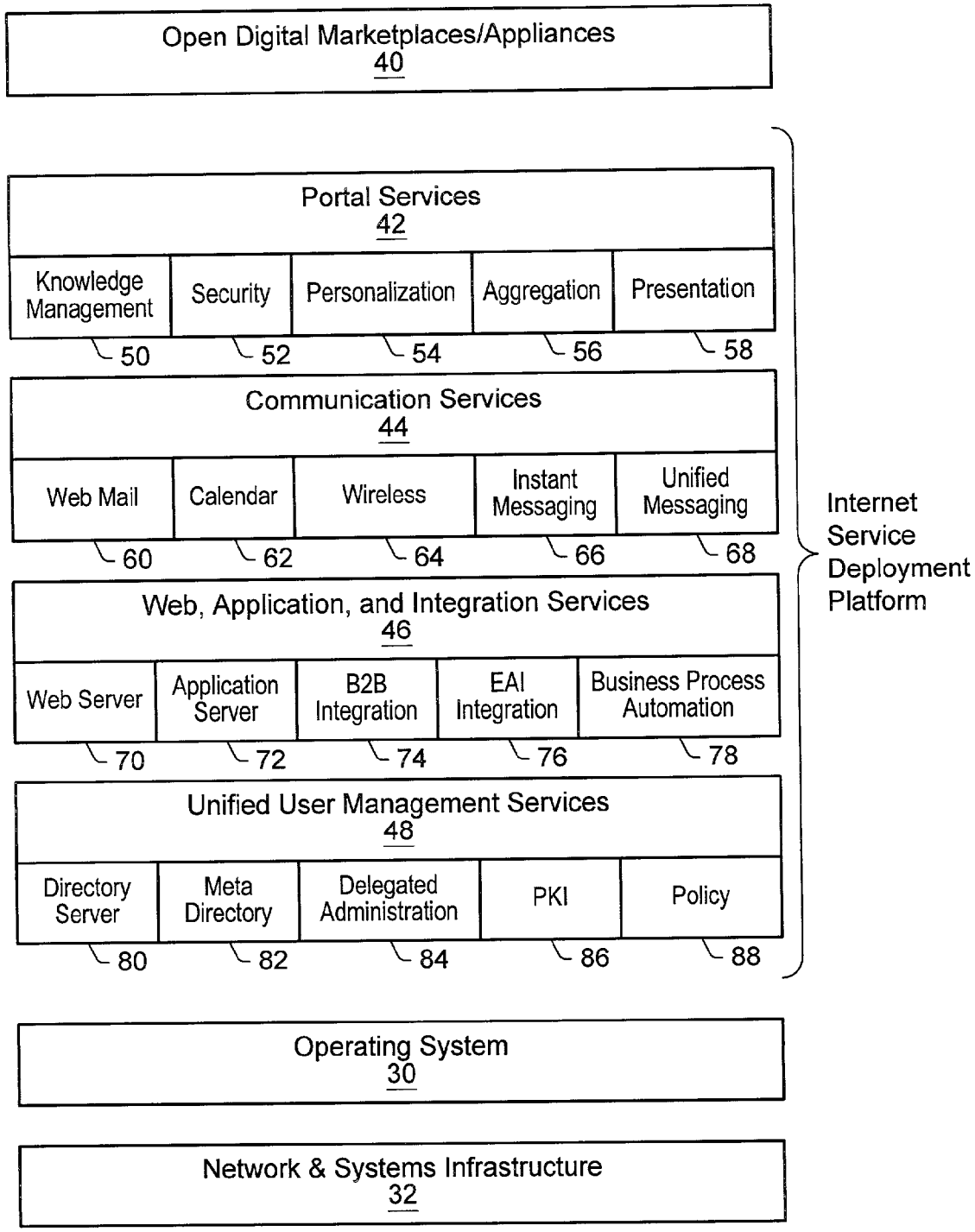
FIG. 3 illustrates a block diagram of an embodiment of an Internet Service Development Platform.

FIG. 3 shows one embodiment of an ISDP (Internet Service Deployment Platform) 28. In one embodiment, ISDP 28 may be an ISDP developed by iplanet E-commerce Solutions, a Sun Microsystems|Netscape Alliance. ISDP 28 may be a "net-enabling" platform that provides business with a very broad, evolving, and standards-based foundation upon which to enable network service. ISDP 28 may incorporate the elements of the Internet portion of the stack and join the elements with traditional platforms at the lower levels. ISDP 28 may sit on top of traditional operating systems 30 and infrastructures 32. This arrangement may allow enterprises and service providers to deploy next generation platforms while preserving "legacy-system" investments, such as a mainframe computer or any other computer equipment that is selected to remain in use after new systems are installed.

ISDP 28 may include multiple integrated layers of software that provide services supporting application development, e.g., business-to-business exchanges, communications and entertainment vehicles, and retail Web sites. In addition, ISDP 28 may employ open standards at each level of integration, enabling customers to mix and match components. ISDP 28 components may be designed to be integrated and optimized to reflect a specific business need. However, there is no requirement that all solutions within the ISDP 28 be employed, or any one or more be exclusively employed.

As shown in FIG. 3, ISDP 28 may include several layers. Graphically, the uppermost layer of ISDP 28 starts below the Open Digital Marketplace/Application strata 40. The uppermost layer of ISDP 28 may be a Portal Services Layer 42 that may provide a basic user point of contact and may be supported by integration solution modules such as knowledge management 50, personalization 52, presentation 54, security 56, and/or aggregation 58.

Next, a layer of specialized Communication Services (44) may handle functions such as unified messaging 68, instant messaging 66, web mail 60, calendar scheduling 62, and/or wireless access interfacing 64.

A layer called Web, Application, and Integration Services 46 may follow. This layer may have different server types to handle the mechanics of user interactions and may include application and Web servers. For example, iPlanet™ offers the iPlanet™ Application Server 72, Web Server 70, Process Manager 78, Enterprise Application and Integration (EAI) 76, and Integrated Development Environment (IDE) tools 74.

Below the server strata, an additional layer called Unified User Management Services 48 may be included to handle issues surrounding management of user populations, including Directory Server 80, Meta-directory 82, delegated administration 84, Public Key Infrastructure (PKI) 86, and/or other administrative/access policies 88. The Unified User Management Services layer 48 may provide a single solution to centrally manage user account information in extranet and e-commerce applications. In one embodiment, the core of this layer may be the iPlanet™ Directory Server 80 or another Lightweight Directory Access Protocol (LDAP)-based directory server.

A LDAP-based directory server such as the iPlanet Directory Server (iDS) may provide a centralized directory service for an intranet or extranet while integrating with existing systems. The term directory service refers to a collection of software, hardware, and processes that store information and make the information available to users. The directory service generally includes at least one instance of the directory server and one or more directory client programs. Client programs can access names, phone numbers, addresses, and/or other data stored in the directory.

One common directory service is a Domain Name System (DNS) server. A DNS server maps computer host names to IP addresses. Thus, all of the computing resources (hosts) become clients of the DNS server. The mapping of host names may allow users of the computing resources to easily locate computers on a network by remembering host names rather than numerical Internet Protocol (IP) addresses. Note that while some directory services such as a DNS server may only store a few types of information, a typical directory service may store virtually unlimited types of information.

A directory server such as iDS may be a general-purpose directory that stores information in a network-accessible repository. Such a directory server may provide a standard protocol and application programming interface (API) to access the information contained by the directory server.

The directory server may provide global directory services, meaning that information may be provided to a wide variety of applications. Until recently, many applications came bundled with a proprietary database. While a proprietary database may be convenient if only one application is used, multiple databases may become an administrative burden if the databases manage the same information. For example, in a network that supports three different proprietary e-mail systems where each system has a proprietary directory service, if a user changes passwords in one directory, the changes may not automatically be replicated in the other directories. Accordingly, managing multiple instances of the same information may result in increased hardware and personnel costs.

A global directory service may provide a single, centralized repository of directory information that any application can access. However, giving a wide variety of applications access to a directory may create a need for a network-based means of communicating between the numerous applications and the single directory. A directory lookup tool such as LDAP may be used to give applications access to the global directory service.

LDAP is the Internet standard for directory lookups, just as the Simple Mail Transfer Protocol (SMTP) is the Internet standard for delivering e-mail and the Hypertext Transfer Protocol (HTTP) is the Internet standard for delivering documents. Technically, LDAP is defined as an on-the-wire bit protocol (similar to HTTP) that runs over Transmission Control Protocol/Internet Protocol (TCP/IP). LDAP creates a standard way for applications to request and manage directory information. X.500 and X.400 are the corresponding Open Systems Interconnect (OSI) standards. LDAP currently supports X.500 Directory Access Protocol (DAP) capabilities and may easily be embedded in lightweight applications (both client and server) such as email, web browsers, and groupware.

An LDAP-compliant directory, such as the iDS, may provide a master directory that owns all user, group, and access control information. In some embodiments, the directory may be hierarchical (as opposed to relational) and may be optimized for reading, reliability, and scalability. This directory may become a specialized central repository that contains information about objects and provides user, group, and/or access control information to all applications on a network. For example, the directory may be used to provide information technology managers with a list of all the hardware and software assets in a widely spanning enterprise. A directory server may also provide resources that all applications can use and aid in the integration of applications that have previously functioned as stand-alone systems. For example, instead of creating an account for each user in each system the user needs to access, a single directory entry may be created for the user in the LDAP directory.

Figure 4:
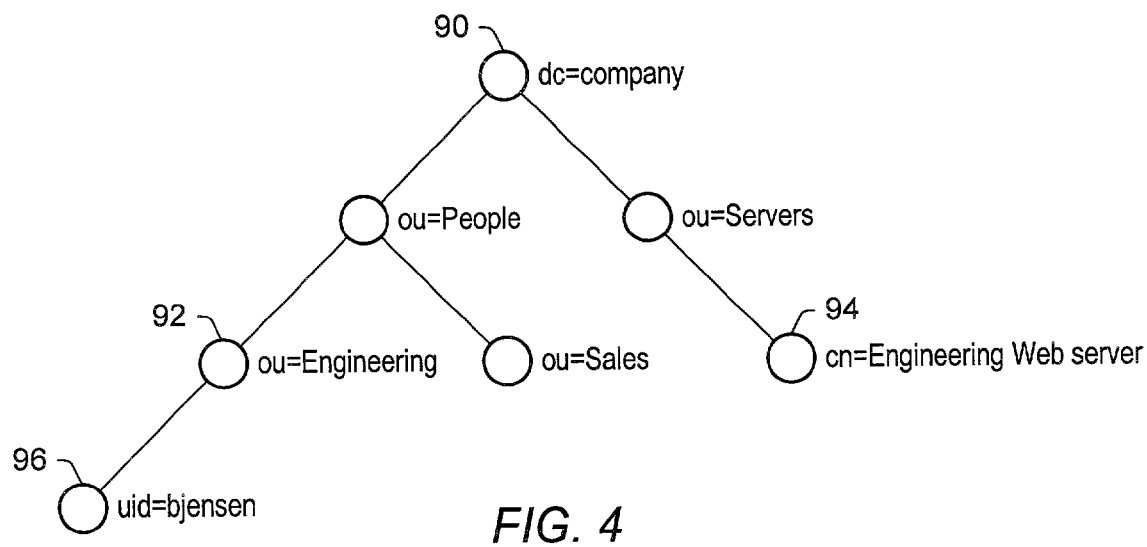
FIG. 4 illustrates part of one embodiment of a directory.

FIG. 4 shows a portion of a typical directory with different entries corresponding to real-world objects. The directory depicts an organization entry 90 with the attribute type of domain component (dc), an organizational unit entry 92 with the attribute type of organizational unit (ou), a server application entry 94 with the attribute type of common name (cn), and a person entry 96 with the attribute type of user ID (uid). All entries may be connected by the directory.

In one embodiment, the directory protocol (e.g., a LDAP protocol) may be a message-oriented protocol. For example, a client may construct an LDAP message containing a request and send the message to the server. The server may process the request and send one or more results back to the client as a series of one or more LDAP messages.

Figure 5:
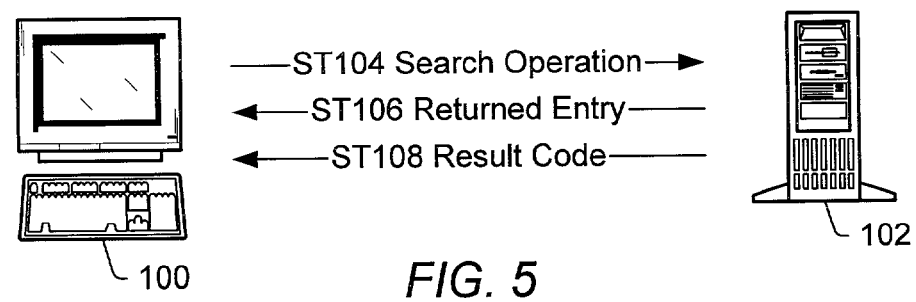
FIG. 5 illustrates the LDAP protocol used for a simple request in one embodiment of a network system.

FIG. 5 shows an example of how an LDAP client 100 may search the directory for a specific entry. The client 100 may construct an LDAP search request message and send the message to the LDAP server 102, (operation ST104). The LDAP server 102 may retrieve the requested entry from the database and send the entry to the client 100 in an LDAP message (operation ST106). A result code may also be returned to the client 100 (e.g., in a separate LDAP message), (operation ST108).

LDAP-compliant directory servers (e.g., iDS) may have nine basic protocol operations. The basic protocol operations may be divided into three categories. The first category is interrogation operations, which include search and compare operators. These interrogation operations allow questions to be asked of the directory. The search operation is used to search the directory for entries and retrieve individual directory entries. In some embodiments, a separate LDAP read operation may not be implemented. The second category of interrogation operations is update operations, which include add, delete, modify, and modify distinguished name (DN) (i.e., rename) operators. A DN is a unique, unambiguous name of an entry in LDAP. Update operations allow information in the directory to be updated.

The third category of protocol operations is authentication and control operations, which include bind, unbind, and abandon operators. The bind operator allows a client to identify itself to the directory by providing an identity and authentication credentials. For example, the client may provide a DN and a set of credentials t to the directory. The server may check whether the credentials are correct for the given DN and, if the credentials are correct, note that the client is authenticated as long as the client's connection remains open or until the client re-authenticates. The unbind operation allows a client to terminate a session. When the client issues an unbind operation, the server may discard any authentication information associated with the client connection, terminate any outstanding LDAP operations, and disconnect from the client, thus closing the TCP connection. The abandon operation allows a client to indicate that the result of an operation (e.g., identified by a message ID in which the request for that operation was submitted) previously submitted is no longer of interest. Upon receiving an abandon request, the server may terminate processing of the operation that corresponds to the message ID.

In addition to the three main groups of operations, the LDAP protocol defines a framework for adding new operations to the protocol via LDAP extended operations. Extended operations allow the protocol to be extended in an orderly manner to meet new marketplace needs as they emerge.

Figures 6, 7:
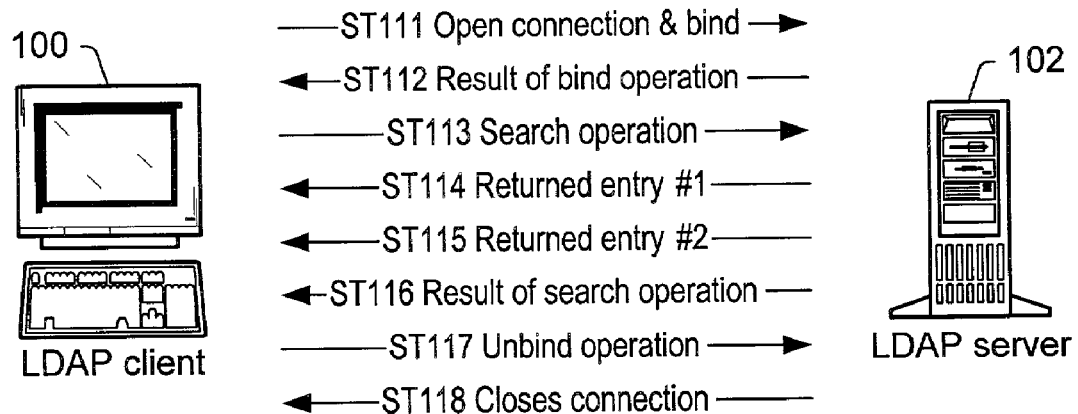
FIG. 6 illustrates an LDAP exchange between the LDAP client and LDAP server according to one embodiment.
FIG. 7 illustrates one embodiment of a directory entry showing attribute types and values.

A typical LDAP client/server exchange may proceed as depicted in FIG. 6. First, the LDAP client 100 opens a TCP connection to the LDAP server 102 and submits the bind operation (operation ST111). This bind operation may include the name of the directory entry that the client wants to authenticate as, along with the credentials to be used when authenticating. Credentials are often simple passwords, but they may also be digital certificates used to authenticate the client 100. After the directory has verified the bind credentials, the directory may return a success result to the client 100 (operation ST 112). Then, the client 100 may issue a search request (operation ST 113). The LDAP server 102 processes this request, which results in two matching entries (operation STs 114 and 115). Next, the LDAP server 102 may send a result message (operation ST 116). The client 100 may then issue the unbind request (operation ST 117), which indicates to the LDAP server 102 that the client 100 wants to disconnect. The LDAP server 102 may oblige by closing the connection (operation ST 118).

Directory-enabled clients may perform useful, complex tasks by combining the basic LDAP operations. For example, an electronic mail client may look up mail recipients in a directory in order to help a user address an e-mail message.

The basic unit of information in the LDAP directory is an entry. An entry is a collection of information about an object. Entries may include a set of attributes, each of which describes one particular trait of an object. Attributes may include an attribute type (e.g., common name (cn), surname (sn), etc.) and one or more values. FIG. 7 shows an exemplary entry 124 showing attribute types 120 and values 122. Attributes may have constraints that limit the type and length of data placed in attribute values 122. A directory scheme may place restrictions on the attribute types 120 that must be, or are allowed to be, contained in the entry 124.

Access Control

An LDAP directory may be provided with access control mechanisms so that regular users only have access to the information they need to know, while other users such as administrators may access large segments of (or all of) the tree.

In some embodiments (e.g., those employing iDS as the directory server), the access control mechanism may be called "Access Control Instructions" (ACIs). An exemplary implementation of a set of ACIs is described below, by way of example only, and for helping to understand this specification.

The access control mechanism, e.g., the ACIs, may be used to target specific attribute values. This means that permissions may be granted or denied on an attribute if the value of that attribute meets the criteria defined in the ACI. An ACI that grants or denies access based on an attribute's value is called a value-based ACI.

Existing access control mechanisms operate on the attribute values as such. For example, the ACI of E1.1.1 may be supplemented with a targetattr clause as shown in E1.1.2, with the effect of restricting "write" access to those whose salary equals 500. Generally, access control schemes like that shown in E.1.1.2 are referred to as 'list of values' schemes. Note that certain conventions in notation are used in the code examples. In code examples, quote signs may be used when required in accordance with the rules of writing code, i.e. for string values. An expression framed with square brackets, e.g. [,property=value]* is optional and may be repeated if followed by *. A name followed with [ ] indicates an array. Also, <attribute> may be used to designate a value for the entity named "attribute" (or attribute).

| E1.1.1 | aci: (target = "ldap: /// cn = persol, o = FT")<br>( targetattr = salary )<br>( acl "example" version 3.0; allow ( write) userdn = " ldap: /// cn = rob, o = FT" ; ) |
|---|---|
| E1.1.2 | aci: (target = " ldap: /// cn = persol, o = FT")<br>( targetattr = salary )<br>( acl "example" version 3.0; allow ( write) userdn = " ldap: /// cn = rob, o = FT " ; )<br>( targetattrvalue = 500 ) |

'List of values' schemes provide a precise and powerful control mechanism. However, such schemes may result in a very large number of ACIs, reciting a whole range of salaries, where it is not desired to grant permission to write for all salaries. For example, one may not be given write access to his own salary and/or read/write access to salaries significantly higher than his own salary.

In another example, in a given organization, permission may be granted to all users to modify the nsRoleDN attribute in their own entry. However, in so doing, it may be desirable to restrict a user from giving himself certain key roles such as "Top Level Administrator."

It has been observed that the access control mechanisms may have to be duplicated a large number of times within a given directory server tree structure. This induces a supplementary load in many respects, including storage capability and the usual compromise in memory between data storage and program execution, in connection with the time needed for execution.

In one embodiment, LDAP filters may be used to target attribute values. The LDAP filters may be provided in an LDAP directory. The scope of the filter expressions may provide control over entries being targeted based on their attribute values.

The filter or filters may also be associated with a class of operations (e.g., add or delete) that then will be controlled by that filter when applied to the particular attribute being targeted.

In some embodiments, LDAP filters may be used to check that the conditions on attribute values are satisfied. To this effect, a corresponding new keyword, indicating the "filter," may be added in the ACI syntax. In one embodiment, the keyword may be "targattrfilters". Exemplary ACI syntax including the keyword "targattrfilters" is shown in E1.2. Several exemplary filters are shown in E1.3

| | |
|---|---|
| E1.2 | aci: (target = " ldap: /// cn = persol, o = FT ") |
| | ( targetattr = salary ) |
| | ( acl "example" version 3.0; allow ( write) userdn = " ldap: /// cn = rob, o = FT" ; ) |
| | ( targattrfilters = "add = salary: (salary < 1000)" ) |
| E1.3 | ( targetattrfilters = "add = salary: (salary = 500") ) |
| | ( targetattrfilters = "add = salary: (salary < 1000") ) |
| | ( targetattrfilters = "add = salary: (salary > 400) && (salary < 1000") ) |
| | ( targetattrfilters = "add = name: (name = *Icnc*) " ) |

Figure 8:
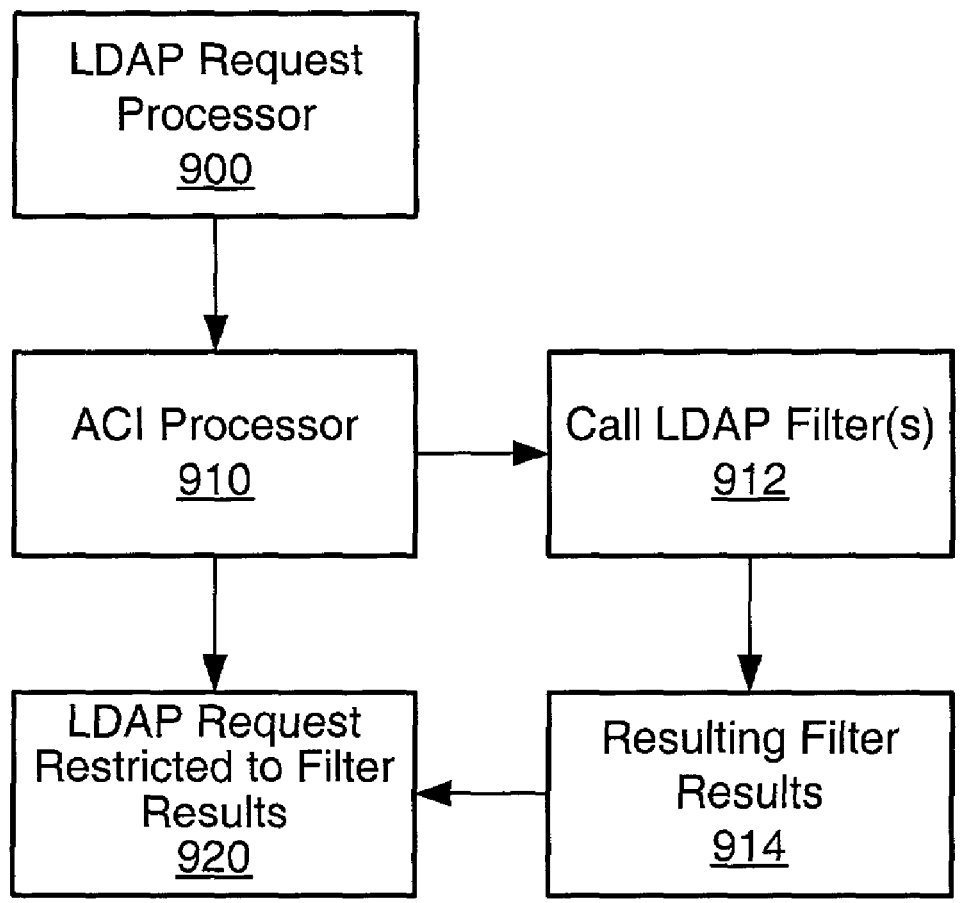
FIG. 8 is a block-diagram showing one embodiment of a system for processing an ACI instruction.

Generally, as shown in FIG. 8, an LDAP request is submitted to an LDAP request processor 900. Where an ACI is involved, an ACI processor 910 is operated. When the ACI uses the "filter-indicating" keyword, e.g. targattrfilters, an LDAP filter function may be called at 912 (once or iteratively, as required) to obtain the filter results 914, which are used to control the execution of the LDAP request at 920, i.e. which information is sent to the client having initiated the LDAP request, or, more broadly, which rights of access to such information are granted to the client for that request.

Considering an LDAP request aiming at one target entry (if it exists), the access is simply authorized or denied, depending upon whether the overall result of the filters is true or false. Certain LDAP requests (like "search" requests) may aim at more than one target entry; if so, block 920 will restrict the execution of the LDAP request to those of the targeted entries that match the filters.

The foregoing description considers an LDAP request aiming at one target entry, unless otherwise indicated.

The LDAP request processor 900 and/or the ACI interpreter or processor 910 may be located in a directory server close to the databases, such that they not easily accessible to regular users. In fact, the directory servers and their respective databases may be in a specific protected zone, also termed "militarized zone", designating a zone whose access is authorized subject to given security conditions, as defined in the field of computer networks.

The ACI interpreter or processor 910 may use an exemplary basic mechanism (operation 812) that will now be described in more detail with reference to FIG. 9. A "current" ACI filter expression is considered, having the form: Attri : Fi, where Attri is an attribute name, and Fi is a current (plain) filter expression, used in connection with Attri. An entry is being examined, and att designates an attribute instance, i.e. an attribute value in that entry, which is involved in plain filter expression Fi.

Operation 8120 executes a filter interpreter on expression Fi to determine its contents. This may involve putting expression Fi in a canonical form, and/or using semantic analysis techniques.

Then, test 8121 determines whether filter expression Fi refers to only one type of attribute, as described above. (In fact, operations 8120 and 8121 are distinguished for clarity, but they might be considered as a single operation as well).

In the embodiment being considered, if Fi refers to more than one type of attribute, then operation 8122 defines a boolean result as false. Otherwise, operation 8123 calls the LDAP filter facilities to evaluate whether Fi verifies on the instance value att under consideration. If not, operation 8124 defines a boolean result as false.

Otherwise, test 8125 determines whether there is another instance of attribute Attri in the target entry. If so, control is returned to operation 8120, with att being now that other instance.

After all instances of attribute Attri in the targeted entry have been explored, operation 8126 defines the boolean result as true if all filters Fi have matched.

Figure 9:
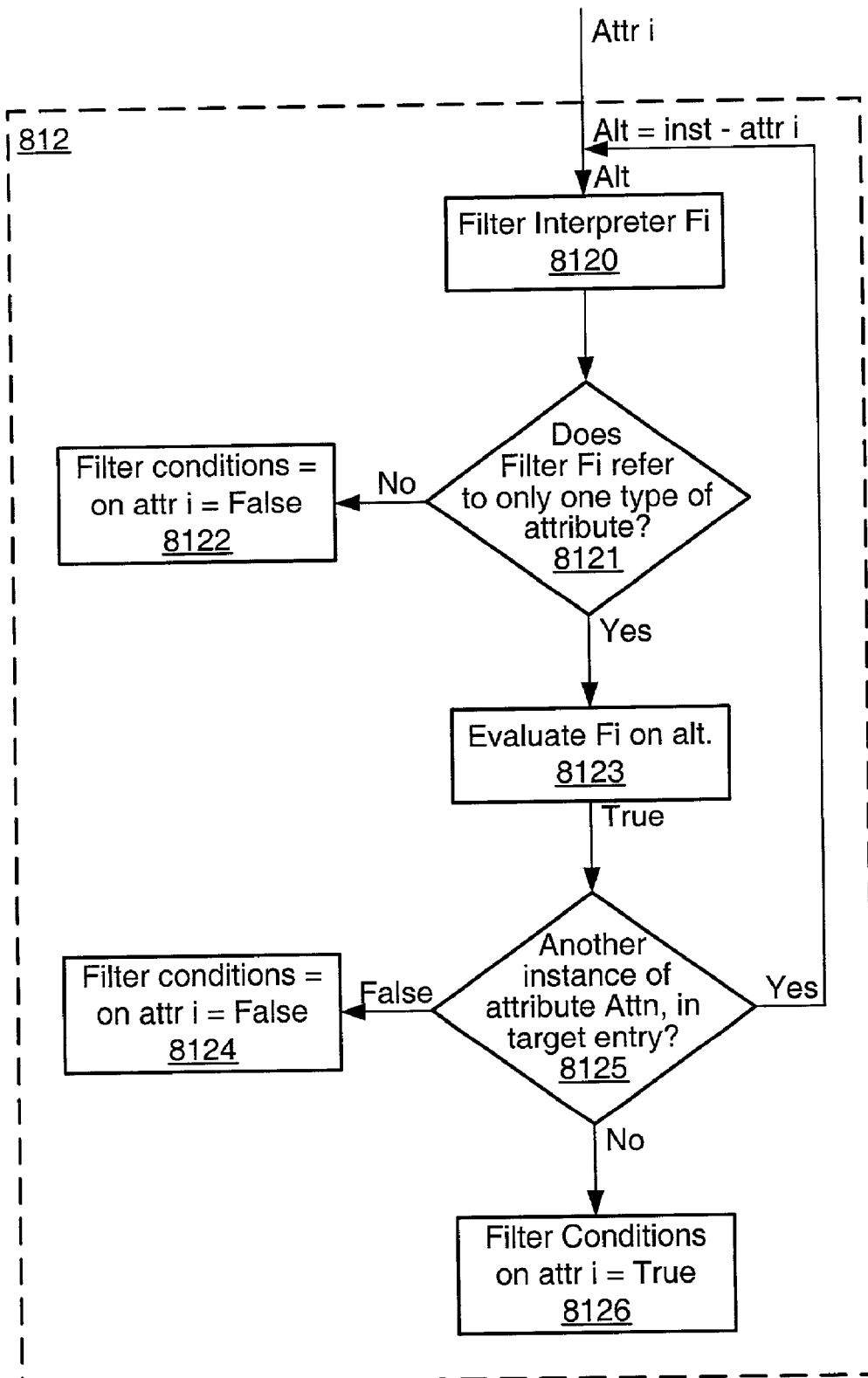
FIG. 9 is a flowchart showing one embodiment of a method of evaluating a set of filter conditions on a set of attributes.

As a whole, operation 812 of FIG. 9 may be seen as a function using the LDAP filter facilities to check conditions on an entry, and returning a true or false boolean. The exemplary embodiment of FIG. 9 is a possible implementation, taking into account the current features of the LDAP schema, including the following facts: an attribute may be authorized as an option, or, by contrast, mandatory; an attribute may be single-valued or multi-valued.

Those skilled in the art will understand that the implementation of FIG. 9 may be adapted, for example in a system where all attributes would be mandatory, and/or at least certain attributes would be single-valued.

Figure 10:
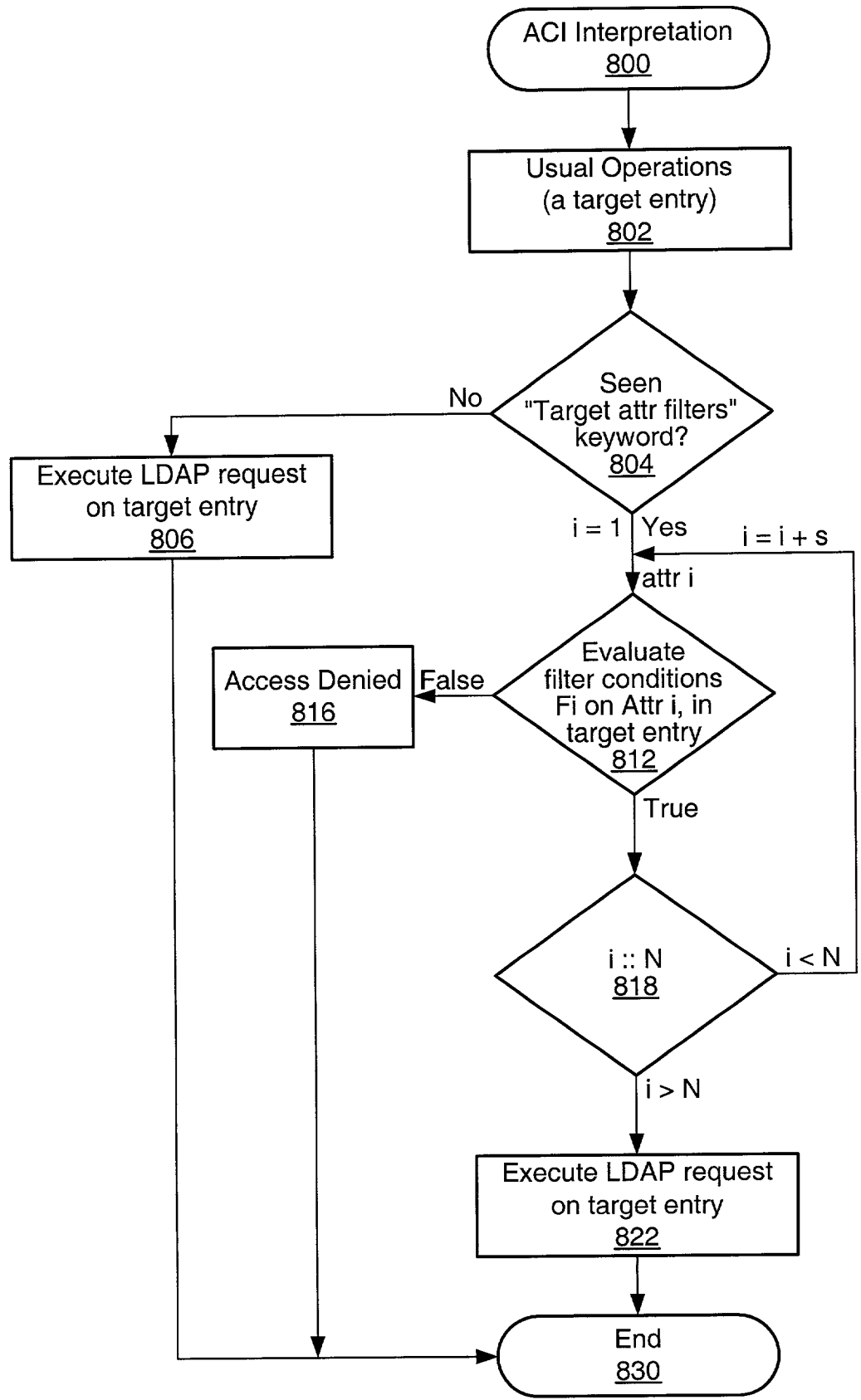
FIG. 10 is a flowchart showing another embodiment of a method of evaluating an ACI.

Now, the overall ACI interpretation or processing may include the exemplary operations illustrated in FIG. 10, starting from operation call 800.

Operation 802 executes the usual interpretation of the ACI keywords. At this time, a target entry corresponding to the request is available in the directory server or servers. The ACI has also been interpreted, except for its filter portion.

Then, test 804 determines whether the LDAP request includes the "filter" keyword, "targattrfilters" in the example. If test 804 finds no filter expression, operation 806 executes the LDAP request on the target entry, i.e. the user is given access to the target entry.

By contrast, if test 804 finds one or more filter expressions, a loop is made on each of these filter expressions, involving operations 812, 816 and 818. Each of the filter expressions may be processed in its turn, as bearing on an attribute Attri. The number of filter expressions is denoted N.

Operation 812 considers a filter expression attached to the "targattrfilters" keyword and bearing on an attribute Attri. In one embodiment, it may operate as described in FIG. 9. If the output of operation 812 is false, operation 816 denies access to the target entry and the loop is terminated.

If the output of operation 812 is true, test 818 (shown as a comparison of i to N) determines whether there are further filter expressions after the filter keyword (targattrfilters in the example). If so, control is given again to operation 812 for processing the next filter expression.

When the loop terminates after operation 818, operation 822 causes the LDAP request to be executed on the target entry. In fact, operation 822 is similar to operation 806.

Alternative ways of processing the sequence of filters may be implemented. For example, the logic could be reversed, using "eliminating" filters instead of "authorization" filters. If so, the loop on i would pass through operation 816, instead of 818, reflecting an "OR" on the eliminating filters, instead of an "AND" on the authorization filters, as shown.

Also, where the ACI targets several entries, the mechanism of FIG. 10 would be repeated for each of these entries.

In accordance with one embodiment, the arguments of the keyword (e.g. targattrfilters) may obey the following syntax, in which the order may be changed: <keyword> <class of operation> <attribute being concerned> <filter expression>.

Appropriate identifiers, delimiters, and/or separators may be used to avoid ambiguities and to facilitate understanding, e.g., <keyword> separator1 delimiter1begin <class of operation> separator2<attribute being concerned> separator 3 delimiter2begin <filter expression> delimiter2end delimiter1end, where separator1, separator2, and separator3 may be one of signs "=" or ":", delimiter1begin and delimiter1end may be a string delimiter (e.g., "or"), and delimiter2begin and delimiter2end may be, for example, "(" and ")" respectively.

In one embodiment, a value based ACI may be created by using the targattrfilters keyword with the syntax as shown in E1.4, where add represents the class of operations which involve creating an attribute and del represents the class of operations which involve deleting an attribute in the <class of operation> argument. In the <attribute being concerned> argument, attrx represents the target attributes. In the <filter expression> argument, Fx represents filters that apply only to the associated attribute.

| E1.4 | (targattrfilters="add=attr1:F1 && attr2:F2 . . . && attrn:Fn,del=attr1:F1 && attr2:F2 . . . && attrn: Fn") |
|---|---|

The attributes and filters after each class of operation may be different, despite their notation being the same. Also, certain portions of the above syntax may be implicit. For example, the attrx may be implicit, e.g., by referring to the preceding attribute attr<x−1> if no attribute is indicated at attrx.

Figure 11:
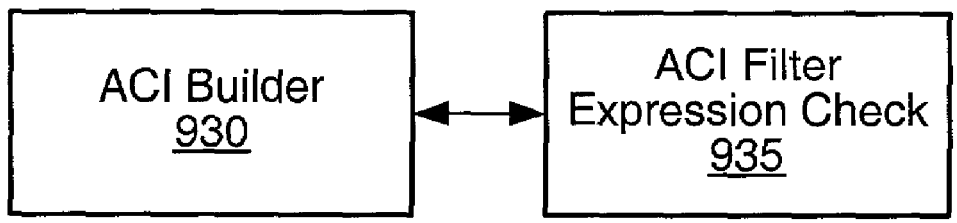
FIG. 11 is a block diagram of one embodiment of a system for constructing ACIs and verifying filter expressions within ACIs.

When created (or modified) by an operator in an ACI builder or constructor module 930 (FIG. 11), an ACI may include one or more filters. If so, the filter may be checked at 935 to verify the filter expression(s). With the exemplary syntax as shown in E1.4, each filter expression Fi (i from 1 to n), may be applied to the LDAP directory (or directory structure) to verify that it indeed has effect on the corresponding attribute attri. This is done separately for each class of operation (add, del, in the example). Creation or modification of an ACI with a filter having no effect may be denied, or a meaningful modification may be prompted.

Other specific features may be provided for in some embodiments. For example, in one embodiment, when creating an entry, if a filter applies to an attribute in the new entry, then each instance of that attribute may be required to satisfy the filter. Similarly, when deleting an entry, if a filter applies to an attribute in the entry, then each instance of that attribute may be required to satisfy the filter. When modifying an entry, if the operation adds an attribute, then it may be required that the add filter that applies to that attribute be satisfied; if the operation deletes an attribute, then it may be required that the delete filter that applies to that attribute be satisfied. In one embodiment, if individual values of an attribute already present in the entry are replaced, then both the add and delete filters may be required to be satisfied.

In an alternative embodiment, a modify filter expression may be used instead of, or in addition to, the add (e.g., to adapt the user interface, if desired). In some embodiments, if modify is added it will mean "delete, then add" (this makes it possible to do some checking between the previous and new attribute value). In such an embodiment, add and delete may apply only in cases of mere creation and deletion, respectively, of an attribute value.

In another optional feature, a search class of operations may be further used, enabling access control when searching in an LDAP directory.

As a particular example, the attribute filter shown in E1.5 is now considered. This filter can be used to allow users to add any role (nsRoleDN attribute) to their own entry except the superAdmin role (the "!" represents the logical "NOT" operation). It also allows users to add a telephone number with a 123 prefix.

| E1.5 | (targattrfilters = "add=nsroleDN : (!(nsRoleDN=cn=superAdmin)) && telephoneNumber: (telephoneNumber=123*)) |
|---|---|

In some embodiments, filter-based access control may provide a solution to a number of problems, e.g. where ranges of attribute values have to be considered in an ACI or other access control mechanism. In the prior art, it was necessary either to list all possible values of the attribute within the range, or to subtype the attribute in accordance with all ranges forming access conditions. In some embodiments, using filter-based access control may provide a more lightweight and quick solution.

Access Control Example

The following discussion describes an example of the tools that may be used for access control in one embodiment of a directory server, as available at the time the server is built. Note that this access control tool is merely exemplary and that alternative access control tools may be used in other embodiments.

Access Control Principles

The mechanism by which one defines access is called access control. When a server receives a request, it uses the authentication information provided by the user in the bind operation and the access control instructions (ACIs) defined in the server to allow or deny access to directory information. The server may be configured to allow or deny permissions such as read, write, search, and compare. The permission level granted to a user may be dependent on the authentication information provided.

Using access control, access to the entire directory, a subtree of the directory, specific entries in the directory (including entries defining configuration tasks), or a specific set of entry attributes may be controlled. Permissions may be set for a specific user, all users belonging to a specific group or role, or all users of the directory. Access may be defined for a specific location such as an IP address or a DNS name.

ACI Structure

Access control instructions may be stored in the directory as attributes of entries. The aci attribute may be an operational attribute. It may be available for use on every entry in the directory, regardless of whether it is defined for the object class of the entry. It may be used by the directory server to evaluate what rights are granted or denied when it receives an LDAP request from a client. The aci attribute may be returned in an ldapsearch operation if specifically requested.

The three main parts of an ACI statement are Target, Permission, and Bind Rule. In some embodiments, the permission and bind rule portions of the ACI are set as a pair and are called an Access Control Rule (ACR). The specified permission may be granted or denied depending on whether the accompanying rule is evaluated to be true.

ACI Placement

If an entry containing an ACI does not have any child entries, the ACI applies to that entry only. If the entry has child entries, the ACI applies to the entry itself and all entries below it. As a result, when the server evaluates access permissions to any given entry, it verifies the ACIs for every entry between the one requested and the directory suffix, as well as the ACIs on the entry itself.

The aci attribute is multi-valued, which means that you can define several ACIs for the same entry or subtree.

An ACI may be created so that it does not apply directly to the entry containing the ACI. Instead, the ACI may apply to some or all of the entries in the subtree below it. This may allow a general ACI that effectively applies to entries more likely to be located lower in the tree to be placed at a high level in the directory tree. For example, at the level of an organizationalUnit entry or a locality entry, one could create an ACI that targets entries that include the inetorgperson object class. Exceptions may exist. For example, ACIs placed in the root DSE entry may only apply to that entry.

This feature may allow the number of ACIs in the directory tree to be reduced by placing general rules at high-level branch points. To limit the scope of more specific rules, they may be placed as close as possible to leaf entries.

ACI Evaluation

To evaluate the access rights to a particular entry, the server may compile a list of the ACIs present on the entry itself and on the parent entries back up to the top level entry stored on the directory server. In one embodiment, ACIs may be evaluated across all of the databases for a particular directory server, but not across directory servers.

The evaluation of this list of ACIs may be done based on the semantics of the ACIs, not on their placement in the directory tree. This means that ACIs that are close to the root of the directory tree may not take precedence over ACIs that are closer to the leaves of the directory tree.

The precedence rule that applies is as follows: ACIs that deny access take precedence over ACIs that allow access. Between ACIs that allow access, union semantics apply, so there is no precedence. For example, if an ACI denies write permission at the directory's root level, then none of the users can write to the directory regardless of the specific permissions you grant them. To grant a specific user write permissions to the directory, you have to restrict the scope of the original denial for write permission so that it does not include the user.

ACI Limitations

When creating an access control policy for a directory service, several restrictions may be considered. For example, in the case of a directory tree being distributed over several servers using the chaining feature, some restrictions may apply to the keywords that may be used in access control statements. Thus, ACIs that depend on group entries (groupdn keyword) may be required to be located on the same server as the group entry. If the group is dynamic, then all members of the group may be required to have an entry on the server too. If the group is static, however, the members's entries may be located on remote servers. ACIs that depend on role definitions (roledn keyword) may be required to be located on the same server as the role definition entry. Every entry that is intended to have the role may also be required to be located on the same server.

Values stored in the target entry may be value matched with values stored in the entry of the bind user (for example, using the userattr keyword). Access may be evaluated normally even if the bind user does not have an entry on server that holds the ACI.

Attributes generated by a CoS (Class of Service) cannot be used in all ACI keywords in some embodiments. Specifically, one should not use attributes generated by CoS with the following keywords: targetfilter,targattrfilters, and userattr. If one creates target filters or bind rules that depend on the value of attributes generated by CoS, the access control rule may not work.

Access control rules may be evaluated on the local server. Therefore, it may not be necessary to specify the hostname or port number of the server in LDAP URLs (Uniform Resource Locators) used in ACI keywords. If one does, the LDAP URL may not be taken into account.

Default ACIs

In some embodiments, default ACIs may apply to some of the directory information. For example, in one embodiment, the following default ACIs mapply to the directory information stored in the userRoot database: users can modify their own entry in the directory, but not delete it or modify the aci and nsroledn attributes; users have anonymous access to the directory for search, compare, and read operations; the administrator (by default uid=admin, ou=Administrators, ou=TopologyManagement, o=NetscapeRoot) has all rights except proxy rights; all members of the Configuration Administrators group have all rights except proxy rights; all members of the Directory Administrators group have all rights except proxy rights; SIE group; and/or whenever a new database is created in the directory, the top entry may have the default ACIs listed above. As used in one embodiment, the NetscapeRoot subtree has its own set of default ACIs: all members of the Configuration Administrators group have all rights on the NetscapeRoot subtree except proxy rights; users have anonymous access to the NetscapeRoot subtree for search and read operations; group expansion; all authenticated users have search, compare, and read rights to configuration attributes that identify the administration server.

Default settings may be modified as needed to suit the needs of a given organization. For example, access control instructions may be created manually using LDIF (Lightweight Directory Interchange Format) ACI statements and added to a directory tree using the ldapmodify utility.

In embodiments using iDS as the directory, if access control is being set for a large number of directory entries, LDIF ACI statements may be used (as opposed to Console). Using LDIF ACI statements may take less time that using Console. Alternatively, to familiarize oneself with LDIF ACI statements, one may want to use the Directory Server Console to set the ACI and then click the Edit Manually button on the Access Control Editor. This shows the correct LDIF syntax. If the operating system allows it, one can even copy the LDIF from the Access Control Editor and paste it into a LDIF file.

ACI Syntax

The aci attribute may use the following syntax: aci: (target)(version 3.0;acl "name";permission bind_rules;), where target specifies the entry, attributes, or set of entries and attributes for which you want to control access. The target can be a distinguished name, one or more attributes, or a single LDAP filter. The target may be an optional part of an ACI. Version 3.0 is a string that identifies the ACI version in this embodiment. "Name" is a name for the ACI. The name may be any string that identifies the ACI. The ACI name may be required in some embodiments. Permission specifically outlines what rights you are either allowing or denying (for example, read or search rights). Bind_rules specify the credentials and bind parameters that a user has to provide to be granted access. Bind rules may also specifically deny access to certain users or groups of users.

One may have multiple permission-bind rule pairs for each target. This may allow multiple access controls for a given target to be efficiently set. For example: target(permission bind_rule)(permission bind_rule) . . . . If one has several ACRs in one ACI statement, the syntax may be of the form: aci: (target)(version 3.0;acl "name";permission bind_rule; permission bind_rule; . . . permission bind_rule;).

Example ACI

The following is an example of a complete LDIF ACI: aci: (target="ldap:///uid=bjensen,dc=siroe,dc=com") (targetattr=*) (version 3.0;acl "acil";allow (write) userdn="ldap:///self";). In this example, the ACI states that the user bjensen has rights to modify all attributes in his/her own directory entry.

The following sections describe the syntax of each portion of an ACI that may be used in one embodiment in more detail.

Defining Targets

The target identifies what the ACI applies to. If the target is not specified, the ACI may apply to the entry containing the aci attribute and to the entries below it. A target may be a directory entry or all of the entries in a subtree, attributes of an entry, a set of entries or attributes that match a specified LDAP filter, and/or an attribute value or combination of values that match a specified LDAP filter.

The general syntax for a target may be (keyword="expression") (keyword!="expression"), where keyword indicates the type of target, equal (=) indicates that the target is the object specified in the expression, and not equal (!=) indicates the target is not the object specified in the expression, and expression identifies the target.

The quotation marks ("") around expression may be required in one embodiment. What you use for expression may be dependent upon the keyword that you supply. The following table lists exemplary keywords and associated expressions:

| Table 6-1_LDIF Target Keywords Keyword | Valid Expressions | Wildcard Allowed? |
|---|---|---|
| target_ | ldap:///distinguished_name_ | yes_ |
| targetattr_ | attribute_ | yes_ |
| targetfilter_ | LDAP_filter_ | yes_ |
| targattrfilters_ | LDAP_operation:LDAP_filter_ | yes_ |

When placing an ACI on an entry, if it is not a leaf entry, the ACI also applies to all entries below it. For example, if one targets the entry ou=accounting,dc=siroe,dc=com, the permissions as set will apply to all entries in the accounting branch of the Siroe tree. As a counter example, when placing an ACI on the ou=accounting,dc=siroe,dc=com entry, one cannot target the uid=sarette,ou=people,dc=siroe,dc=com entry because it is not located under the accounting tree.

Targeting a Directory Entry

To target a directory entry (and the entries below it), one may use the target keyword. The target keyword may accept a value of the following format: target="ldap:///distinguished_name". This identifies the distinguished name of the entry to which the access control rule applies. For example: (target="ldap:///uid=bjensen,dc=siroe,dc=com"). If the DN of the entry to which the access control rule applies contains special characters such as commas, the special characters may be escaped with a single backslash (\). For example: (target="ldap:///uid=lfuentes,dc=Siroe Bolivia\,S.A.").

One may also use a wildcard when targeting a distinguished name using the target keyword. The wildcard indicates that any character or string or substring is a match for the wildcard. Pattern matching may be based on any other strings that have been specified with the wildcard. The following are legal examples of wildcard usage: (target="ldap:///uid=*,dc=siroe,dc=com") (matches every entry in the entire Siroe tree that has the uid attribute in the entry's RDN (Relative Distinguished Name)); (target="ldap:///uid=*Anderson,dc=siroe,dc=com") (matches every entry directly under the Siroe node with a uid ending in Anderson); and (target="ldap:///uid=C*A,dc=siroe,dc=com") (matches every entry directly under the Siroe node with a uid beginning with C and ending with A).

Depending on the position of the wildcard, it may apply to the full DN, not only to attribute values. Therefore, the wildcard may be used as a substitute for portions of the DN. For example, uid=andy*,dc=siroe,dc=com targets all the directory entries in the entire Siroe tree with a matching uid attribute, and not just the entries that are immediately below the dc=siroe,dc=com node. In other words, this target matches with longer expressions such as uid=andy,ou=eng, dc=siroe,dc=com, or uid=andy,ou=marketing,dc=siroe, dc=com. Some other valid examples follow: (target="ldap:///uid=*,dc=siroe,dc=com") (matches every entry in the entire Siroe tree that has the uid attribute in the entry's RDN); (target="ldap:///uid=*,ou=*,dc=siroe, dc=com") (matches every entry in the Siroe tree whose distinguished name contains the uid and ou attributes). Thus, uid=fchen, ou=Engineering, dc=siroe, dc=com or uid=claire, ou=Engineering, ou=people, dc=siroe, dc=com would match, but the following would not: uid=bjensen, dc=siroe, dc=comou=Engineering, dc=siroe, dc=com.

As they may be cited in this specification, Sun, Sun Microsystems, Solaris, Java, EmbeddedJava, PersonalJava, JavaBeans, Java Naming and Directory Interface, JDBC, Enterprise JavaBeans (EJB), Jini, Sun Spontaneous Management, Java 2 Enterprise Edition (J2EE), JavaServer Pages (JSP) and I-planet are trademarks of Sun Microsystems, Inc. SPARC is a trademark of SPARC International, Inc.

Numerous variations and modifications will become apparent to those skilled in the art once the above disclosure is fully appreciated. It is intended that the following claims be interpreted to embrace all such variations and modifications.

What is claimed is:

1. A computer-implemented method, comprising:
 storing an access control specification identifying a target entity to which access is to be controlled at a directory server, wherein the access control specification includes an acceptability criterion for operations on the target entity, wherein the acceptability criterion specifies a set of one or more acceptable values for an attribute of the target entity;

in response to a request for an operation on the target entity from a requester, determining whether the operation violates the acceptability criterion, wherein said determining comprises determining whether the operation modifies the attribute value to a value outside the set;

in response to determining that the operation does not violate the acceptability criteria, performing the operation; and in response to determining that the operation violates the acceptability criteria, indicating that the request is denied.

2. The method as recited in claim 1, wherein the acceptability criterion includes a respective acceptable set for each attribute of a plurality of attributes, and an indication of whether it is necessary to determine the acceptability of each attribute in order to determine that the operation does not violate the acceptability criteria, or whether the acceptability of any one of the attributes is sufficient to determine that the operation does not violate the acceptability criterion.

3. The method as recited in claim 1, wherein said determining whether the operation violates the acceptability criterion comprises:

determining whether a value of the attribute prior to the request is within the acceptable set; and determining that the operation violates the acceptability criterion if a value of the attribute prior to the request is outside the acceptable set.

4. The method as recited in claim 1, wherein the attribute is a multi-valued attribute, and wherein, prior to the request, the attribute has a plurality of values, wherein said determining whether the operation violates the acceptability criterion further comprises:

determining whether each of the plurality of values of the attribute prior to the request is within the acceptable set; and determining that the operation violates the acceptability criterion if at least one of the plurality of values prior to the request is outside the acceptable set.

5. The method as recited in claim 1, wherein the access control specification specifies a category of directory server operations to which the acceptability criterion is to be applied.

6. The method as recited in claim 1, wherein the acceptability criterion is comprised within an access control instruction stored at the directory server.

7. The method as recited in claim 1, further comprising:

receiving input from an operator indicating the acceptability criterion; and validating the acceptability criterion, wherein said validating comprises:

checking syntax of the input in accordance with a predefined syntax for specifying acceptability criteria; and validating the set of acceptable values specified in the input.

8. The method as recited in claim 5, wherein the category of directory server operations comprises at least one of: operations that create attribute values, operations that delete attribute values, operations that modify existing attribute values, and operations that search for attribute values.

9. The method as recited in claim 5, wherein the access control specification specifies a plurality of categories of directory server operations and a respective acceptability criterion for each category of the plurality of categories.

10. The method as recited in claim 6, wherein the location of the acceptability criterion within the access control instruction is indicated by a keyword.

11. A system, comprising:

a processor; and memory coupled to the processor, wherein the memory stores program instructions executable by the processor to:

store an access control specification identifying a target entity to which access is to be controlled at a directory server, wherein the access control specification includes an acceptability criterion for operations on the target entity, wherein the acceptability criterion specifies a set of one or more acceptable values for an attribute of the target entity;

in response to a request for an operation on the target entity from a requester, determine whether the operation violates the acceptability criterion, wherein said determining comprises determining whether the operation modifies the attribute value to a value outside the set;

in response to determining that the operation does not violate the acceptability criteria, perform the operation; and in response to determining that the operation violates the acceptability criteria, indicate that the request is denied.

12. The system as recited in claim 11, wherein the acceptability criterion includes a respective acceptable set for each attribute of a plurality of attributes, and an indication of whether it is necessary to determine the acceptability of each attribute in order to determine that the operation does not violate the acceptability criteria, or whether the acceptability of any one of the attributes is sufficient to determine that the operation does not violate the acceptability criterion.

13. The system as recited in claim 11, wherein said determining whether the operation violates the acceptability criterion comprises:

determining whether a value of the attribute prior to the request is within the acceptable set; and determining that the operation violates the acceptability criterion if a value of the attribute prior to the request is outside the acceptable set.

14. The system as recited in claim 11, wherein the attribute is a multi-valued attribute, and wherein, prior to the request, the attribute has a plurality of values, wherein said determining whether the operation violates the acceptability criterion further comprises:

determining whether each of the plurality of values of the attribute prior to the request is within the acceptable set; and determining that the operation violates the acceptability criterion if at least one of the plurality of values prior to the request is outside the acceptable set.

15. The system as recited in claim 11, wherein the access control specification specifies a category of directory server operations to which the acceptability criterion is to be applied.

16. The system as recited in claim 11, wherein the acceptability criterion is comprised within an access control instruction stored at the directory server.

17. The system as recited in claim 11, wherein the instructions are further executable to:

receive input from an operator indicating the acceptability criterion; and validate the acceptability criterion specified in the input, wherein said validating comprises:
checking syntax of the input in accordance with a predefined syntax for specifying acceptability criteria; and
validating the set of acceptable values specified in the input.

18. The method as recited in claim 15, wherein the category of directory server operations comprises at least one of: operations that create attribute values, operations that delete attribute values, operations that modify existing attribute values, and operations that search for attribute values.

19. The system as recited in claim 15, wherein the access control specification specifies a plurality of categories of directory server operations and a respective acceptability criterion for each category of the plurality of categories.

20. The system as recited in claim 16, wherein the location of the acceptability criterion within the access control instruction is indicated by a keyword.

21. A tangible, computer-readable medium, comprising program instructions, wherein the instructions are computer-executable to:
store an access control specification identifying a target entity to which access is to be controlled at a directory server, wherein the access control specification includes an acceptability criterion for operations on the target entity, wherein the acceptability criterion specifies a set of one or more acceptable values for an attribute of the target entity;
in response to a request for an operation on the target entity from a requester, determine whether the operation violates the acceptability criterion, wherein said determining comprises determining whether the operation modifies the attribute value to a value outside the set;
in response to determining that the operation does not violate the acceptability criteria, perform the operation; and
in response to determining that the operation violates the acceptability criteria, indicate that the request is denied.

22. The computer-readable medium as recited in claim 21, wherein the acceptability criterion includes a respective acceptable set for each attribute of a plurality of attributes, and an indication of whether it is necessary to determine the acceptability of each attribute in order to determine that the operation does not violate the acceptability criteria, or whether the acceptability of any one of the attributes is sufficient to determine that the operation does not violate the acceptability criterion.

23. The computer readable medium as recited in claim 21, wherein said determining whether the operation violates the acceptability criterion comprises:
determining whether a value of the attribute prior to the request is within the acceptable set; and
determining that the operation violates the acceptability criterion if a value of the attribute prior to the request is outside the acceptable set.

24. The computer readable medium as recited in claim 21, wherein the attribute is a multi-valued attribute, and wherein, prior to the request, the attribute has a plurality of values, wherein said determining whether the operation violates the acceptability criterion further comprises:
determining whether each of the plurality of values of the attribute prior to the request is within the acceptable set; and
determining that the operation violates the acceptability criterion if at least one of the plurality of values prior to the request is outside the acceptable set.

25. The computer readable medium as recited in claim 21, wherein the access control specification specifies a category of directory server operations to which the acceptability criterion is to be applied.

26. The computer-readable medium as recited in claim 21, wherein the acceptability criterion is comprised within an access control instruction stored at the directory server.

27. The computer-readable medium as recited in claim 21, wherein the instructions are further executable to:
receive input from an operator indicating the acceptability criterion; and
validate the acceptability criterion specified in the input, wherein said validating comprises:
checking syntax of the input in accordance with a predefined syntax for specifying acceptability criteria; and
validating the set of acceptable values specified in the input.

28. The computer-readable medium as recited in claim 25, wherein the category of directory server operations comprises at least one of: operations that create attribute values, operations that delete attribute values, operations that modify existing attribute values, and operations that search for attribute values.

29. The computer-readable medium as recited in claim 25, wherein the access control specification specifies a plurality of categories of directory server operations and a respective acceptability criterion for each category of the plurality of categories.

30. The computer-readable medium as recited in claim 26, wherein the location of the acceptability criterion within the access control instruction is indicated by a keyword.

31. A directory server, comprising:
a database storing directory entnes representing a plurality of entities managed using the directory server;
an access control instruction builder configured to receive as input from an operator an acceptability criterion for an access control instruction indicating, based on specified acceptable values of an attribute of a particular entity of the plurality of entities, whether a directory server operation is permissible on the particular entity;
an access control processor configured to:
in response to a request for the operation on the particular entity from a requester, determine whether the operation violates the acceptability criterion by setting the attribute to an unacceptable value;
in response to determining that the operation does not violate the acceptability criteria, permit the operation to be performed; and
in response to determining that the operation violates the acceptability criteria, disallow the operation.

* * * * *

UNITED STATES PATENT AND TRADEMARK OFFICE
CERTIFICATE OF CORRECTION

| | | |
|---|---|---|
| PATENT NO. | : 7,024,693 B2 | Page 1 of 1 |
| APPLICATION NO. | : 10/010748 | |
| DATED | : April 4, 2006 | |
| INVENTOR(S) | : Robert Byrne | |

It is certified that error appears in the above-identified patent and that said Letters Patent is hereby corrected as shown below:

In the Claims:

Claim 31, column 20, line 42, please delete the word "entnes" and insert --entries-- in place thereof.

Signed and Sealed this

Eleventh Day of July, 2006

JON W. DUDAS
*Director of the United States Patent and Trademark Office*